(12) United States Patent
Joo et al.

(10) Patent No.: US 12,281,196 B2
(45) Date of Patent: Apr. 22, 2025

(54) POLYESTER TIRE CORD HAVING EXCELLENT HEAT RESISTANCE, AND TIRE COMPRISING SAME

(71) Applicant: HS Hyosung Advanced Materials Corporation, Seoul (KR)

(72) Inventors: Si-Hwan Joo, Sejong-si (KR); Cheol Kim, Seongnam-si (KR); Jin-Kyeong Park, Yongin-si (KR)

(73) Assignee: HS Hyosung Advanced Materials Corporation, Seoul (KR)

( * ) Notice: Subject to any disclaimer, the term of this patent is extended or adjusted under 35 U.S.C. 154(b) by 145 days.

(21) Appl. No.: 17/639,027

(22) PCT Filed: Aug. 21, 2020

(86) PCT No.: PCT/KR2020/011203
§ 371 (c)(1),
(2) Date: Feb. 28, 2022

(87) PCT Pub. No.: WO2021/045418
PCT Pub. Date: Mar. 11, 2021

(65) Prior Publication Data
US 2022/0325038 A1   Oct. 13, 2022

(30) Foreign Application Priority Data

Sep. 5, 2019  (KR) .................. 10-2019-0110267

(51) Int. Cl.
*B60C 9/00* (2006.01)
*C08G 63/183* (2006.01)
*D02G 3/48* (2006.01)

(52) U.S. Cl.
CPC .......... *C08G 63/183* (2013.01); *B60C 9/0042* (2013.01); *D02G 3/48* (2013.01); *B60C 2009/0085* (2013.01)

(58) Field of Classification Search
CPC .......... B60C 9/0042; B60C 2009/0475; B60C 2009/0416; D02G 3/48
See application file for complete search history.

(56) References Cited

U.S. PATENT DOCUMENTS

| 4,101,525 A | 7/1978 | Davis et al. |
| 5,067,538 A | 11/1991 | Nelson et al. |
| 5,472,781 A | 12/1995 | Kim et al. |

FOREIGN PATENT DOCUMENTS

| EP | 0423213 B2 | 3/2000 |
| GB | 526163 A * | 9/1940 |

(Continued)

OTHER PUBLICATIONS

International Search Report and Written Opinion of PCT/KR2020/011203, Nov. 27, 2020, 13 pages including English translation of the Search Report.

*Primary Examiner* — Justin R Fischer
(74) *Attorney, Agent, or Firm* — HSML P.C.

(57) ABSTRACT

The present invention relates to a polyester tire cord made of polyester yarn and having a 5% LASE of 1.2 g/d or more as measured according to ASTM D885 at 80° C., a 5% LASE of 1.0 g/d or more as measured according to ASTM D885 at 120° C., and a toughness retention rate of 65% or more at 80° C. and 120° C. The tire cord of the present invention has a modulus comparable to that of rayon even in a high-temperature environment at 120° C. or higher, and has excellent dimensional stability and heat resistance, and thus it can be advantageously applied to a high-performance tire.

11 Claims, 2 Drawing Sheets

(56) References Cited

FOREIGN PATENT DOCUMENTS

| KR | 10-0140228 B1 | | 7/1998 |
|---|---|---|---|
| KR | 10-2011-0078773 | | 7/2011 |
| KR | 20140089159 | * | 7/2014 |
| KR | 10-2017-0082891 | | 7/2017 |
| KR | 10-1838499 B1 | | 3/2018 |
| KR | 10-1979352 B1 | | 5/2019 |

* cited by examiner

POLYESTER TIRE CORD HAVING EXCELLENT HEAT RESISTANCE, AND TIRE COMPRISING SAME

TECHNICAL FIELD

The present invention relates to a tire cord made of polyester fiber and a tire including the same, and particularly to a polyester tire cord having excellent heat resistance and dimensional stability, and a high-performance tire manufactured using the same.

BACKGROUND ART

As fibers for tire cords, polyester, nylon, rayon, etc. have been used, and recently, aramid fibers have also been developed for use as tire cords. Nylon fibers have been used as fibers for tire cords because of their high strength and toughness. However, because nylon fibers have a high thermal shrinkage rate and low modulus, they have been used for bias tires of large vehicles without being used as high-performance tire cords.

Rayon fiber cords have been used for high-performance tires because they have excellent thermal stability and show little deterioration in mechanical properties at high temperatures. However, rayon fiber cords have low strength and high manufacturing costs and contain sulfur dioxide which causes environmental pollution problems, and thus their use tends to decrease.

Polyester fibers have a higher modulus and lower heat shrinkage rate than nylon fibers, and thus have also been widely used for tire cords. However, polyester fibers have a problem of poor dimensional stability because they show a reduced elastic modulus and an increased shrinkage rate during tire molding (vulcanization process) due to a decrease in heat resistance with increasing temperature. In particular, the dimensional stability of the polyester fiber cord is much lower than the dimensional stability of the rayon fiber cord, and thus the polyester fiber cord is hardly applied to ultra-high-performance tires. In order to increase the dimensional stability of the polyester fiber cord to a level comparable to that of the rayon fiber cord, high-speed spinning and spin-draft increasing technologies have been applied.

However, when these technologies are applied, a problem arises in that the strengths of yarns and dipped cords are lowered due to the decrease in spinning and drawing properties resulting from an excessive increase in the crystallinity of undrawn yarns. Meanwhile, when the drawing property is increased in order to improve the strength of the tire cord, the processability becomes poor, so that the appearance of the yarn becomes poor and the strength utilization rate is reduced.

In addition, in order to use polyester fibers for tire cords, it is required not only to improve strength but also to improve dimensional stability so that shape deformation does not occur at high temperatures during tire running. Even in the case of a polyester tire cord, a flatspot phenomenon occurs which is a temporary geometric deformation resulting from cooling a heated tire at high speed during parking, and thus when the polyester tire cord is mounted on a vehicle, a problem arises in that noise occurs.

In addition, although the polyester tire cord has slightly improved dimensional stability, it has reduced elastic modulus and heat resistance in a high-temperature environment at 120° C. or higher during tire running, suggesting that it cannot be used as a substitute for a rayon fiber cord in ultra-high-performance tires.

PRIOR ART LITERATURE

Patent Literature (Patent Document 1) U.S. Pat. No. 4,101,525 B
(Patent Document 2) U.S. Pat. No. 5,067,538 B
(Patent Document 3) U.S. Pat. No. 5,472,781 B
(Patent Document 4) EP 0423213 B

DISCLOSURE

Technical Problem

The present invention has been conceived to overcome the above-described problems of the prior art, and an object of the present invention is to provide a polyester tire cord that has an elastic modulus comparable to that of rayon and has excellent dimensional stability and heat resistance, even in a high temperature environment at 120° C. or higher.

Another object of the present invention is to provide a high-performance tire that may be reduced in weight by including a tire cord having excellent dimensional stability, may have improved running performance, such as reduced noise during running due to a decrease in the flatspot phenomenon, and may have improved fuel efficiency due to a reduction in rolling resistance.

Technical Solution

One aspect of the present invention for achieving the above-described objects is directed to a polyester tire cord made of polyester yarn and having a 5% LASE of 1.2 g/d or more as measured according to ASTM D885 at 80° C., a 5% LASE of 1.0 g/d or more as measured according to ASTM D885 at 120° C., and a toughness retention rate of 65% or more at 80° C. and 120° C. as calculated by the following Equation 6:

$$\text{Toughness retention rate } (T_{25}\text{-}T_{80}) = (\text{toughness value at } T_{80}/\text{toughness value at } T_{25}) \times 100$$

$$\text{Toughness retention rate } (T_{25}\text{-}T_{120}) = (\text{toughness value at } T_{120}/\text{toughness value at } T_{25}) \times 100 \quad \text{[Equation 6]}$$

wherein the toughness value at $T_{25}$ is the toughness value of the polyester tire cord, measured after standing at 25° C. and 65% RH for 24 hours, the toughness value at $T_{80}$ is the toughness value of the polyester tire cord, measured at an atmosphere temperature of 80° C., and the toughness value at $T_{120}$ is the toughness value of the polyester tire cord, measured at an atmosphere temperature of 120° C.

Another aspect of the present invention for achieving the above objects is directed to a tire including the polyester tire cord of the present invention.

Advantageous Effects

The polyester tire cord of the present invention has an elastic modulus comparable to that of rayon, and has excellent heat resistance and dimensional stability, and thus it may replace part of an ultra-high-performance tire (UHPT) including a rayon cord. Thus, according to the present invention, it is possible to not only solve the environmental pollution problem occurring during the manufacture of rayon cords, but also provide a remarkable effect of reducing the manufacturing cost of the ultra-high-performance tire by using the polyester tire cord which is relatively inexpensive.

In addition, since the polyester tire cord of the present invention has excellent heat resistance and dimensional stability, the elastic modulus of the cord is maintained even if the amount of cord used during tire molding. Thus, the polyester tire cord may reduce the weight and rolling resistance of a tire without degrading the performance of the tire, thereby improving the fuel efficiency of a vehicle.

In addition, the polyester tire cord having high heat resistance and high elastic modulus according to the present invention has good toughness due to its relatively high elongation at break, and exhibits high toughness retention in a high-temperature environment. Thus, the polyester tire cord may improve the durability and high-temperature elastic modulus of a tire, thereby reducing the flatspot phenomenon and exhibiting reduced running noise, improved ride comfort, improved handling, improved high-speed durability, and excellent tire running performance.

BEST MODE

Figure 1:
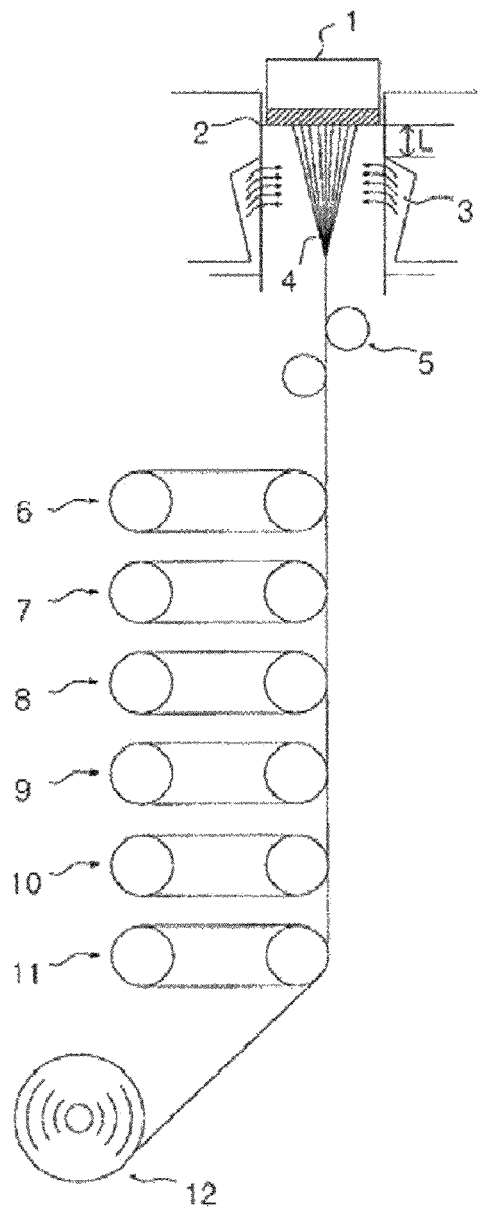
FIG. 1 schematically shows a 6-stage spinning system and drawing process for polyester yarns which are used for a polyester tire cord according to one embodiment of the present invention.

Hereinafter, preferred embodiments of the present invention will be described in more detail with reference to the accompanying drawings.

In the following description, the detailed description of related publicly-known technology or configuration will be omitted when it may unnecessarily obscure the subject matter of the present invention.

Throughout the present specification, it is to be understood that when any part is referred to as "including" any component, it does not exclude other components, but may further include other components, unless otherwise specified.

As used herein, the term "cord" refers to a product which serves as a reinforcing strand constituting the reinforcing structure of a tire and is formed by twisting a plurality of yarns.

As used herein, the term "LASE (Load at Specified Elongation)" means a load at specific elongation.

In the present invention, "dimensional stability (E-S)" is expressed as the sum of elongation (E) at specific load and shrinkage (S). A tire with a low dimensional stability (E-S) value has low thermal deformation, and thus a tire including a cord with a low E-S value may have high uniformity and improved performance compared to a tire including a cord having a high E-S value.

As used herein, the term "carcass" means a tire structure including a tire belt structure, a tread, an undertread and a bead portion excluding sidewall rubber on a ply.

As used herein, the term "specific draw ratio" means the ratio of a spin draft to a total draw ratio.

As used herein, the term "spin draft" means the ratio of the linear velocity (m/min) of a first draw roller to the polymer discharge rate per unit area in a spinning nozzle.

As used herein, the term "flatspot" means a phenomenon in which, when a tire cord has a low transition temperature and a high thermal shrinkage rate and is cooled after shrinkage of the footprint, the flatspot is maintained until the tire cord reaches its glass transition temperature again.

One aspect of the present invention for achieving the above-described objects is directed to a polyester tire cord made of polyester yarn and having a 5% LASE of 1.2 g/d or more as measured according to ASTM D885 at 80° C. or higher, a 5% LASE of 1.0 g/d or more as measured according to ASTM D885 at 120° C., and a toughness retention rate of 65% or more at 80° C. and 120° C., as calculated by the following Equation 6:

Toughness retention rate $(T_{25}-T_{80})$=(toughness value at $T_{80}$/toughness value at $T_{25}$)×100

Toughness retention rate $(T_{25}-T_{120})$=(toughness value at $T_{120}$/toughness value at $T_{25}$)×100 [Equation 6]

wherein the toughness value at $T_{25}$ is the toughness value of the polyester tire cord, measured after standing at 25° C. and 65% RH for 24 hours, the toughness value at $T_{80}$ is the toughness value of the polyester tire cord, measured at an atmosphere temperature of 80° C., and the toughness value at $T_{120}$ is the toughness value of the polyester tire cord, measured at an atmosphere temperature of 120° C.

Preferred examples of polyester fiber that may be used in the present invention include polyester fiber composed of dicarboxylic acid and glycol. Examples of the dicarboxylic acid include terephthalic acid, 2,6-naphthalene dicarboxylic acid, isophthalic acid, 1,4-cyclohexanedicarboxylic acid, and the like. In addition, examples of the glycol component include ethylene glycol, propylene glycol, tetramethylene glycol, 1,4-cyclohexanedimethanol, and the like. A portion of the dicarboxylic acid component may be replaced with adipic acid, sebacic acid, dimer acid, sulfonic acid metal-substituted isophthalic acid, or the like. In addition, a portion of the glycol component may be replaced with diethylene glycol, neopentyl glycol, 1,4-cyclohexanediol, 1,4-cyclohexanedimethanol, polyalkylene glycol, or the like. Among these polyesters, polyethylene terephthalate, in which 90 mol % or more of the dicarboxylic acid component consists of terephthalic acid and 90 mol % or more of the glycol component consists of ethylene glycol, is preferable. As the polyester yarn, in addition to polyethylene terephthalate (PET), polybutylene terephthalate (PBT), polyethylene naphthalene (PEN), or polytrimethylene terephthalate (PTT) may also be used. The most preferred polyester polymer types are polyethylene terephthalate and polyethylene naphthalate.

To the polyester may be added various inorganic particles such as titanium oxide, silicon oxide, calcium carbonate, silicon nitride, mud, talc, kaolin, and zirconic acid, or particles such as cross-linked polymer particles or various metal particles, etc., as well as conventional antioxidants, metal ion sequestrants, ion exchangers, coloring inhibitors, waxes, silicone oil, and various surfactants.

The tire cord according to one embodiment of the present invention has an $L/E_{80}$ value of 1.5 kg/% to 3.5 kg/% as calculated by the following Equation 1, and an $L/E_{120}$ value of 1.0 kg/% to 3.0 kg/% as calculated by Equation 1.

$L/E_T$=LASE (kg, @5%)/elongation at specific load (%, @2.25 g/d) [Equation 1]

wherein LASE (Load At Specific Elongation) represents a load at an elongation of 5%, measured at a predetermined temperature (T) (° C.), and E represents an elongation at a load of 2.25 g/d.

The tire cord of the present invention may has a strength of 5.0 g/d or more, a shrinkage of 3% or less after 2 minutes at a load of 0.05 g/d at 177° C., a 5% LASE of 2 g/d or more at room temperature, and an elongation of 4 to 6% at a load of 2.25 g/d. If the shrinkage rate of the tire cord is higher than 3%, the tire performance may be degraded due to increased tire deformation during tire manufacturing.

The polyester yarn used in the tire cord of the present invention simultaneously satisfies an elongation of 2.5% to 3.0% at a load of 2.25 g/d, an elongation of 5.0% to 6.0% at a load of 4.5 g/d, and an elongation of 7.5 to 9.0% at a load of 6.75 g/d. If a polyester yarn that does not the above-described elongation at specific load is used for a tire cord, shape deformation due to a difference in the elastic modulus of the tire cord during tire manufacturing may increase, causing tire defects and performance degradation.

In addition, the polyester yarn may simultaneously satisfy the following conditions (1) to (6).

(1) Intrinsic viscosity (I.V.): 0.85 to 1.00
(2) Strength: 7.0 g/d or higher
(3) Amorphous orientation factor (AOF): 0.70 to 0.80
(4) Shrinkage rate: 4.0% or less
(5) Crystallinity: 50% or higher
(6) Dimensional stability (E–S index): 8.5% or less In the present invention, the dimension stability (E–S index) is expressed as the sum of the shrinkage (measured after standing at a temperature of 177° C. under a load of 0.05 g/d for 2 minutes) and the elongation at a load of 2.25 g/d. A lower value of the dimensional stability indicates a smaller change in the shape of the tire coed and better heat resistance.

In the present invention, the stretched polyester yarn may be produced to have a high fineness of 1,000 to 4,000 denier, and thus may meet the needs of the art for obtaining a tire cord having a high fineness while exhibiting excellent physical properties. If the fineness of the polyester yarn is less than 1,000 denier, sufficient strength as a tire cord may not be ensured, and if the fineness is more than 4,000 denier, stable spinning may be difficult and weight reduction of the tire may be suppressed.

A method of manufacturing a polyester tire cord according to the present invention will now be described.

In the production of the polyester yarn for a tire cord according to the present invention, the spin-draft is increased within a range of 1,500 to 2,500 through ultra-high-speed spinning at a spinning speed of 3,500 or more, the specific draw ratio is set within a range of 800 to 1,400, and the total draw ratio of the yarn is adjusted within a range of 1.6 to 1.9 to change the microstructure of the final yarn. Thereby, it is possible to produce a tire cord having improved heat resistance and dimensional stability compared to a conventional high-modulus low shrinkage (HMLS) yarn and dipped cord.

First, polyethylene terephthalate chips having an intrinsic viscosity of 1.0 to 1.15 are melted and extruded through a nozzle, thereby producing spun yarn. Here, the polyethylene terephthalate polymer may include at least 85 mol % of ethylene terephthalate units, but may also include ethylene terephthalate units alone.

Optionally, the polyethylene terephthalate may contain ethylene glycol and terephthalate dicarboxylic acid or derivatives thereof and small amounts of comonomer units derived from one or more ester-forming components.

Examples of the ester-forming components copolymerizable with the polyethylene terephthalate units include glycols such as 1,3-propanediol, 1,4-butanediol, 1,6-hexanediol, and the like, and dicarboxylic acids such as terephthalic acid, isophthalic acid, hexahydroterephthalic acid, stilbenedicarboxylic, bibenzoic acid, adipic acid, sebacic acid, and azelaic acid.

Terephthalic acid (TPA) and ethylene glycol as raw materials are melt-mixed with the produced polyethylene terephthalate chips at a ratio of 2.0 to 2.3, and the melt mixture is subjected to transesterification and polycondensation to form raw chips. Thereafter, the raw chips are subjected to solid-state polymerization at a temperature of 220° C. to 240° C. under vacuum so as to have an intrinsic viscosity of 1.00 to 1.15. At this time, if the intrinsic viscosity of the solid-state polymerized chip is less than 1.00, the intrinsic viscosity of the final drawn yarn may be lowered, and thus the drawn yarn cannot exhibit high strength as a tire cord after heat treatment, and if the intrinsic viscosity of the chips is more than 1.15, the spinning tension and the cross-section of the spun yarn become non-uniform due to the non-uniformity of the polymer melt phase and an increase in undissolved crystalline material, and thus a lot of filament cuts may occur during stretching, resulting in poor spinning workability.

In addition, as a polymerization catalyst, an antimony compound, preferably antimony trioxide, may optionally be added during the polycondensation reaction so that the amount of antimony metal remaining in the final polymer is 180 to 300 ppm. If the residual amount of antimony metal is less than 180 ppm, the polymerization reaction rate may decrease and the polymerization efficiency may be lowered, and if the residual amount is more than 300 ppm, more than necessary antimony metal may act as a foreign material, thus reducing the spinning and drawing workability.

The polyethylene terephthalate chips described above are melted and extruded through a nozzle, thus producing spun yarn. At this time, the diameter of the nozzle is preferably 1.1 to 1.4 mm. Thereafter, the spun yarn is quenched and solidified by passage through a cooling zone.

At this time, if necessary, a heating device having a predetermined length is installed in a zone ranging from directly below the nozzle to the starting point of the cooling zone, that is, in the length (L) section of the hood. This zone is called the delayed cooling zone or the heating zone, which has a length of 50 to 150 mm and a temperature of 300 to 400° C. (temperature of the air contact surface).

In the cooling zone, depending on a method of blowing cooling air, an open quenching method, a circular closed quenching method, a radial outflow quenching method, a radial inflow quenching method or the like may be applied, but is not limited thereto. At this time, the temperature of the cooling air that is injected into the cooling zone for quenching is adjusted to a temperature of 10 to 30° C. This quenching using a sudden temperature difference between the hood and the cooling zone is intended to increase the solidification point and the spun polymer and the spinning tension, thereby increasing the orientation of undrawn yarn and the formation of a linkage between crystals. Thereafter, the yarn solidified by passage through the cooling zone may be oiled with 0.3 to 1.0 wt % of an oil by an oil application device in order to increase the drawability of the yarn and thermal efficiency while reducing the coefficient of friction between the single yarns.

The oiled spun yarn is spun to form undrawn yarn. At this time, the spin draft is preferably 1,500 to 2,500, and the spinning speed (the speed of a first godet roller 6) is 3,000 m/min or more, preferably 3,500 m/min or more. When spinning is performed at a spin draft and a spinning speed within the above ranges, it is possible to ensure excellent strength of the yarn even at a low draw ratio. If the spin draft is less than 1,500 or the spinning speed (the speed of the first godet roller 6) is less than 3,000 m/min, the cross-sectional uniformity of the yarn may deteriorate, resulting in reduction in the drawing workability, and the degree of orientation of the undrawn yarn may be reduced, so that the degree of crystallinity may be lowered. In addition, in this case, the crystalline part may not be developed, and thus during drawing and dipping, thermal stability may be lowered and the strength of the tire cord may be lowered, and when high drawing is performed to improve the strength and modulus, the dimensional stability may be reduced. If the spin draft is more than 4,000 m/min, the drawability of the undrawn yarn may be reduced, and thus the strength and drawing workability of the yarn may be reduced.

Meanwhile, if the specific draw ratio (spin draft/total draw ratio) is less than 800, the dimensional stability may be reduced due to increases in the elongation at specific load and the shrinkage rate, and if the specific draw ratio is more than 1500, the strength of the yarn may be lowered due to an excessive increase in crystallization.

In addition, if the orientation degree of the undrawn yarn is less than 0.06, it is not possible to increase the degree of crystallinity and the density of crystals in the microstructure of the yarn, and if the orientation degree is more than 0.09, the drawing workability may be undesirably reduced.

The yarn that passed through the first drawing roller is drawn through a series of drawing rollers by a spin draw method to form a drawn yarn. In the drawing process, the undrawn yarn may be drawn in multiple stages, and the temperature of each drawing roller is preferably higher than the glass transition temperature of the undrawn yarn and is lower than 95° C., but the temperature of the last drawing roller is preferably 200 to 250° C. If the temperature of the last drawing roller is lower than 200° C., the crystallinity and the size of the crystals may not increase in the drawing process, and thus the strength and thermal stability of the yarn cannot be exhibited, and the dimensional stability at high temperature may be lowered. If the temperature of the last drawing roller is higher than 250° C., which is close to the melting point thereof, the microstructure of the yarn becomes non-uniform, a problem may arise in that the microstructure of the yarn becomes unstable due to decomposition of the crystals, and thus the strength of the yarn is reduced.

At this time, the winding speed of the drawn yarn is preferably 6,000 m/min or more. If the winding speed is less than 6,000 m/min, productivity may be reduced.

In addition, the total draw ratio of the yarn formed by winding as described above is preferably 1.6 to 1.9. If the draw ratio is less than 1.6, productivity may be lowered and the strength and shape stability of the yarn and cord may be lowered, and if the draw ratio is more than 1.9, crystallization of the oriented amorphous portion may increase, resulting in lowering of drawing workability and yarn breakage, and the molecular chain of the amorphous portion in the microstructure of the yarn may be broken, and thus the uniformity of the molecular chain may be lowered, which may decrease the strength utilization rate. In particular, in the case of ultra-high speed spinning, the draw ratio is preferably 1.9 or less due to the restriction of the draw ratio adjustment depending on the spinning equipment.

Thereafter, the produced polyethylene terephthalate yarn is twisted, woven and dipped to produce a dipped cord. First, a raw cord for a tire cord is produced by twisting three polyethylene terephthalate yarns using either a twisting machine in which false twisting and plying are performed stepwise or a direct twisting machine in which s false twisting and plying are performed simultaneously. The twisted yarn is produced by ply twisting the polyethylene terephthalate yarn, followed by cable twisting. In general, the ply twist and the cable twist have the same twist number (level of twist) or have different twist numbers as needed.

In the present invention, the twist number of the polyethylene terephthalate dipped cord is 200 (ply twist number)/200 (cable twist number) TPM (twist per meter) to 400/400 TPM. When the ply twist number is the same as the cable twist number, the produced dipped cord may not show rotation or twist and may be easily maintained in a straight line, so that expression of the physical properties thereof may be maximized. At this time, if the number of ply twists/cable twists is less than 200/200 TPM, the elongation at break of the raw cord may be reduced and the fatigue resistance thereof may be likely to decrease, and if the number of ply twists/cable twists is more than 400/400 TPM, the raw cord will be not suitable for use as a tire cord due to a great decrease in the strength thereof.

Thereafter, the woven yarn is dipped in a dipping solution, dried, drawn and heat-set, and then dipped again in the dipping solution again, dried and heat-set, thus producing a dipped cord. The dipping solution is not particularly limited, but is preferably a mixed resin of epoxy, para-chlorophenol-based resorcinol and formalin (Pexul). At this time, the drying should not be performed at high temperatures, and is preferably performed at a temperature of 90 to 180° C. for 180 to 220 seconds. If the drying temperature is lower than 90° C., drying may not be sufficiently accomplished, and gel may be formed by the dipping solution resin during drying and heat treatment, and if the drying temperature is higher than 180° C., gel may be formed by the dipping solution resin due to rapid drying, and uneven adhesion between the cord and the dipping solution resin may occur.

The heat setting is performed so that the cord dipped in the dipping liquid resin has proper adhesion to tire rubber. The heating setting is preferably performed at a temperature of 220 to 250° C. for 50 to 90 seconds. If the heat setting is performed for less than 50 seconds, the reaction time of the adhesive solution will be insufficient and the adhesion may be lowered, and if the heat setting is performed for more than 90 seconds, the hardness of the adhesive solution may be lowered, thereby reducing the fatigue resistance of the cord.

Figure 2:
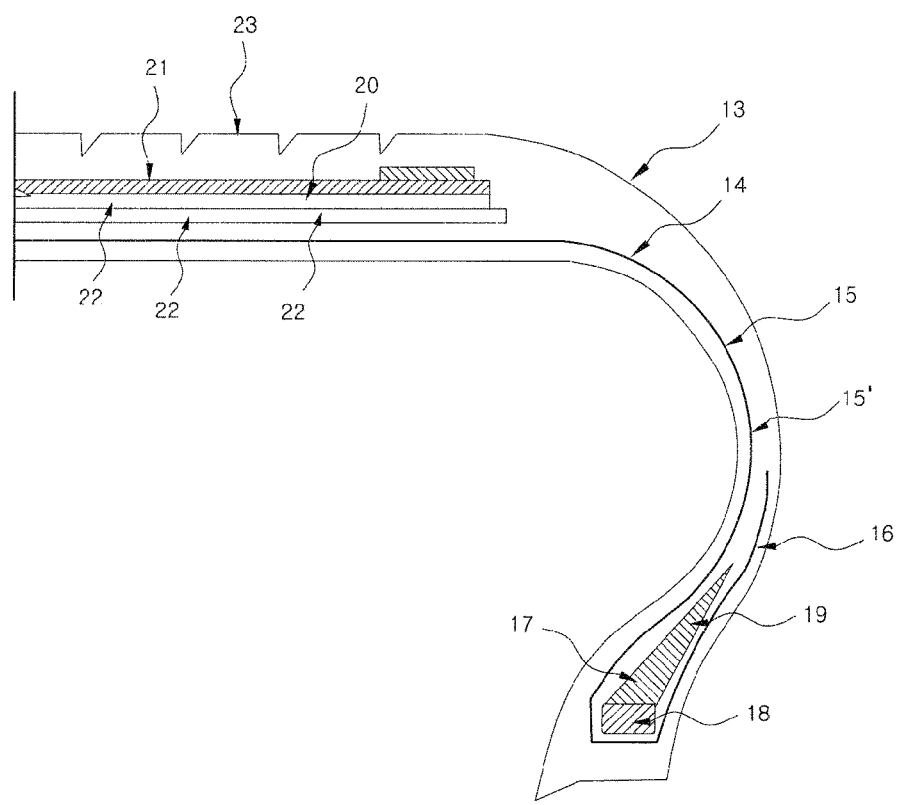
FIG. 2 is a sectional view showing a tire manufactured using the polyester tire cord according to one embodiment of the present invention.

Another aspect of the present invention is directed to a tire obtained by applying a high-strength polyester cord having excellent heat resistance and dimensional stability to a carcass. FIG. 2 is a schematic cross-sectional view showing a tire for a passenger car manufactured by applying the polyethylene terephthalate cord according to the present invention to a carcass.

Referring to FIG. 2, the tire of the present invention includes: a carcass 14 extending from a tread portion 23 through a sidewall portion 13 to each bead core 18 of an opposing bead portion 17; and a belt portion 22 disposed radially outward of the carcass 14 on the tread 23. The carcass 14 includes at least one carcass ply 15 on which the polyester carcass cord of the invention is disposed at an angle of, for example, 80° to 90° with respect to the equator of the tire. The carcass ply 15 may be composed of: a toroidal body part 15' extending from one bead core 18 to the opposite bead core 18 and passing through the crown area of the tire; and a turnup portion 16 extending from both ends of the body part 15' and being folded up around the bead core 18 from the axially inner side of the tire to the axially outer side to fix the carcass ply. In FIG. 2, reference numeral 19 denotes a bead filler, and reference numerals 20 and 21 denote a belt structure and a cap ply, respectively.

As described above, the polyester tire cord of the present invention has various excellent properties such as modulus, strength, and elongation, and exhibits high heat resistance and dimensional stability even in a high-temperature environment, thereby reducing the flatspot phenomenon. A tire including the cord of the present invention has excellent riding comfort and running performance while showing improved fuel efficiency.

Hereinafter, the present invention will be described in more detail with reference to examples, but these examples are for illustrative purposes only, and the scope of the present invention is not limited to these examples.

Method for Evaluation of Properties of Polyester Fiber and Tire Cord

The physical properties of the polyethylene terephthalate yarn and tire cord obtained in the Examples below were measured or evaluated as follows.

(1) Intrinsic Viscosity (I.V.)

0.1 g of a sample was dissolved in a reagent (obtained by mixing phenol and 1,1,2,3-tetrachloroethanol together at a weight ratio of 6:4) at 90° C. for 90 minutes so that the concentration thereof was 0.4 g/100 ml. Then, the solution was transferred to an Ubbelohde viscometer and maintained in a thermostat at 30° C. for 10 minutes, and the drop time of the solution was measured using a viscometer and an aspirator. In addition, the drop time of a solvent was also measured in the same manner as described above, and then R.V. and I.V. values were calculated by the following Equations 2 and 3.

$$\text{Relative viscosity (R.V.)} = \text{drop time of sample/drop time of solvent} \quad \text{[Equation 2]}$$

$$\text{Intrinsic Viscosity (I.V.)} = \tfrac{1}{4} \times (\text{R.V.} - 1)/\text{concentration} + \tfrac{3}{4} \times (\ln \text{R.V.}/\text{concentration}) \quad \text{[Equation 3]}$$

(2) LASE (Load at Specified Elongation)

The load at the elongation corresponding to 5% was taken from the elongation load curve obtained by the ASTM D885 measurement method. A sample before measurement was left to stand at 20° C. and 65% RH for 24 hours and then measured.

(3) Strength (kgf) of Tire Cord

After a sample was left to stand at 25° C. and 65% relative humidity for 24 hours, measurement was performed using a low-speed elongation tensile tester (Instron). After twisting at 80 TPM, a sample having a length of 250 mm was measured at a tensile speed of 300 m/min.

(4) Elongation (%) of Tire Cord at Specific Load

For measurement of the elongation at specific load, the elongations of the yarn at loads corresponding to loads of 2.25 g/d, 4.5 g/d and 6.75 g/d on the elongation S-S curve were measured, and the elongation of the cord at a load of 2.25 g/d was measured.

(5) Shrinkage (%)

Using the ratio of the length (L0), measured at a static load of 0.05 g/d after standing at 25° C. and 65% relative humidity for 24 hours, to the length (L1) measured after treatment at a static load of 0.05 g/d at 177° C. for 2 minutes, shrinkage (%) was calculated according to the following Equation 4:

$$S\ (\%) = (L0 - L1)/L0 \times 100 \quad \text{[Equation 4]}$$

(6) Dimensional Stability Index (E–S)

In this Example, the dimensional stability index was calculated as the sum of shrinkage and the elongation (E) at a load of 4.5 g/d for the yarn or the elongation (E) at a load of 2.25 g/d for the treated cord.

$$\text{Dimensional stability } (E-S) = \text{elongation } (E) \text{ at specific load} + \text{shrinkage } (S) \quad \text{[Equation 5]}$$

(7) Toughness Retention Rate (%)

Using the toughness of the polyester cord, measured after standing at 5° C. and 65% relative humidity for 24 hours, and the toughness measured at a temperature of 80° C. or 120° C., the toughness retention rate was calculated according to the following Equation.

$$\text{Toughness retention rate } (T_{25} - T_{80}) = (\text{toughness value at } T_{80}/\text{toughness value at } T_{25}) \times 100$$

$$\text{Toughness retention rate } (T_{25} - T_{120}) = (\text{toughness value at } T_{120}/\text{toughness value at } T_{25}) \times 100 \quad \text{[Equation 6]}$$

wherein the toughness value at $T_{25}$ is the toughness value of the polyester cord, measured after standing at 25° C. and 65% RH for 24 hours, the toughness value at $T_{80}$ is the toughness value of the polyester cord, measured at an atmosphere temperature of 80° C., and the toughness value at $T_{120}$ is the toughness value of the polyester cord, measured at an atmosphere temperature of 120° C.

(8) Degree of Crystallinity (%)

The degree of crystallinity was measured by the density method using a density gradient tube. The degree of crystallinity (X) was calculated according to the following Equation 7 wherein ρc is the density of the crystal region, ρa is the density of the amorphous region, and ρ is the density of the sample.

$$X\ (\%) = (\rho c - \rho)/(\rho c - \rho a) \times 100 \quad \text{[Equation 7]}$$

In the case of polyester, ρc=1.455 g/cm³, and ρa=1.355 g/cm³.

(9) Amorphous Orientation Function (Fa)

Using the birefringence measured using a polarizing microscope and the crystalline orientation function index measured from XRD, the amorphous orientation function was calculated by the following Equation 8:

$$Fa = (\text{birefringence} - \text{crystalline orientation function} \times 0.251 \times (\text{degree of crystallinity } (\%)/100))/(0.24 \times (1 - \text{degree of crystallinity } (\%)/100)) \quad \text{[Equation 8]}$$

Example 1

Solid-state-polymerized polyethylene terephthalate chips having an intrinsic viscosity (I.V.) of 1.08 dl/g and a moisture content of 10 ppm and containing 250 ppm of antimony metal were produced. The produced chips were melt-spun using an extruder at a discharge rate of 1,500 g/min and a spin draft ratio of 1,800 at a temperature of 300° C. Next, the spun yarn was solidified by passage through a 100-mm-length heating zone (installed directly under the nozzle; ambient temperature of 380° C.) and a 530-mm-length cooling zone (20° C.; blown with cooling air at an air speed of 0.5 m/sec), and then oiled with a solvent-containing spinning oil (containing 30% paraffin oil component). At a spinning speed (the speed of the first godet roller 6) of 3,500 m/min, POY yarn was wound. The first drawing step was performed at a draw ratio of 1.3 at 65° C., the second drawing step was performed at a draw ratio of 1.1 at 70° C., and the third drawing step was performed at a draw ratio of 1.2 at 75° C. The drawn yarn was heat-set at 250° C., relaxed at 1.5%, and then wound, thereby producing a final drawn yarn having a fineness of 2,040 denier.

Three produced yarns were twisted at 276 TPM and plied to produce a raw cord. The raw cord was dipped in epoxy resin and Pexul adhesive solution in a dipping tank, and then dried in a drying zone at 170° C. under 3.5% drawing for 150 seconds, and heat-set in a high-temperature drawing zone at 245° C. under 3.0% drawing for 150 seconds. Next, the cord was dipped again in RFL, dried at 170° C. for 100 seconds, and heat-set at 245° C. under −5.0% drawing for 40 seconds, thereby producing a dipped cord.

The physical properties of the polyester drawn yarn and dipped cord produced as described above were evaluated, and the results are shown in Tables 1 and 2 below.

Examples 2 to 4 and Comparative Examples 1 to 3

Polyethylene terephthalate drawn yarns and dipped cords of Comparative Examples 1 to 3 were produced in the same manner as in Example 1 while spinning conditions such as spin draft, draw ratio, and intrinsic elongation modulus were changed as shown in Table 1 below.

The physical properties of the polyester drawn yarns and dipped cords produced as described above were evaluated, and the results are shown in Tables 1 and 2 below.

TABLE 1

|  |  | Comparative Example | | | Example | | | |
|---|---|---|---|---|---|---|---|---|
|  |  | 1 | 2 | 3 | 1 | 2 | 3 | 4 |
| Yarn production conditions | Spinning system | 5 stages | 5 stages | 6 stages | 6 stages | 6 stages | 6 stages | 6 stages |
|  | Spinning speed (GR1 speed) | 2,500 | 4,000 | 4,400 | 3,500 | 3,800 | 3,900 | 4,000 |
|  | Spin draft | 690 | 2500 | 2800 | 1800 | 2000 | 2050 | 2400 |
|  | Total draw ratio | 2.04 | 1.58 | 1.50 | 1.80 | 1.72 | 1.70 | 1.75 |
|  | Specific draw ratio | 338 | 1582 | 1867 | 1000 | 1163 | 1206 | 1371 |
| Physical properties of yarn | Viscosity (dl/g) | 0.92 | 0.92 | 0.92 | 0.92 | 0.92 | 0.92 | 0.92 |
|  | Degree of cystallinity (%) | 44.1% | 52.4% | 56.5% | 52.0% | 54.5% | 55.0% | 54.8% |
|  | Amorphous orientation function | 0.78 | 0.65 | 0.78 | 0.75 | 0.74 | 0.74 | 0.71 |
|  | Fineness (denier) | 2040 | 2040 | 2040 | 2040 | 2040 | 2040 | 2040 |
|  | Strength (kg) | 15.5 | 12.4 | 12.9 | 15.6 | 15.6 | 15.7 | 14.5 |
|  | Strength (g/d) | 7.6 | 6.1 | 6.3 | 7.6 | 7.6 | 7.7 | 7.1 |
|  | Elongation at load of 2.25 g/d | 3.2 | 3.1 | 2.9 | 2.8 | 2.7 | 2.7 | 2.9 |
|  | Elongation at load of 4.5 g/d | 6.3 | 7.5 | 5.8 | 5.7 | 5.6 | 5.6 | 5.9 |
|  | Elongation at load of 6.75 g/d | 9.3 | Not measurable | Not measurable | 8.2 | 8.1 | 8.0 | 8.8 |
|  | Elongation (%) at break | 13.0 | 20.0 | 15.2 | 14.2 | 14.0 | 13.9 | 16.8 |
|  | Shrinkage (%) | 5.0 | 0.8 | 2.4 | 2.7 | 2.7 | 2.6 | 2.3 |
|  | E-S (%, at 4.5 g/d) | 11.3 | 8.3 | 8.2 | 8.4 | 8.3 | 8.2 | 8.2 |

TABLE 2

|  |  | Comparative Example | | | Example | | | |
|---|---|---|---|---|---|---|---|---|
|  |  | 1 | 2 | 3 | 1 | 2 | 3 | 4 |
| 25° C. | Structure (denier/ply) | 2000 d/3p | 2000 d/3p | 2000 d/3p | 2000 d/3p | 2000 d/3p | 2000 d/3p | 2000 d/3p |
|  | Twist number (TPM) | 276 | 276 | 276 | 276 | 276 | 276 | 276 |
|  | Denier | 6920 | 6920 | 6920 | 6920 | 6920 | 6920 | 6920 |
|  | Strength (kg) | 41.7 | 33.5 | 31.9 | 43.5 | 43.6 | 43.6 | 37.5 |
|  | Load (g/d) | 6.0 | 4.8 | 4.6 | 6.3 | 6.3 | 6.3 | 5.4 |
|  | LASE (g/d, @5%) | 1.85 | 1.53 | 2.73 | 2.60 | 2.65 | 2.65 | 2.15 |
|  | Elongation (%) at load of 2.25 g/d | 6.2 | 7.7 | 3.7 | 4.2 | 4.2 | 4.1 | 5.8 |
|  | Elongation (%) at break | 21.4 | 26.0 | 14.0 | 16.8 | 16.3 | 16.0 | 22.5 |
|  | Shrinkage (%) | 2.3 | 0.3 | 2.4 | 2.0 | 2.0 | 2.0 | 0.4 |
|  | E-S (%) | 8.5 | 8.0 | 6.1 | 6.2 | 6.2 | 6.1 | 6.2 |
|  | Toughness (kg-mm) | 1345 | 1483 | 885 | 1145 | 1121 | 1115 | 1245 |
| 80° C. | Strength (kg) | 32.1 | 27.5 | 26.4 | 35.5 | 35.6 | 35.6 | 30.5 |
|  | Strength (g/d) | 4.6 | 4.0 | 3.8 | 5.1 | 5.1 | 5.1 | 4.4 |
|  | LASE (g/d, @5%) | 1.4 | 1.0 | 2.4 | 2.1 | 2.1 | 2.2 | 1.3 |
|  | Elongation (%) at load of 2.25 g/d | 7.9 | 8.6 | 4.0 | 5.4 | 5.3 | 5.2 | 6.2 |
|  | L/E$_{80}$ | 1.2 | 0.8 | 4.2 | 2.7 | 2.7 | 2.9 | 1.6 |
|  | Elongation (%) at break | 17.3 | 23.0 | 11.5 | 16.0 | 15.8 | 15.5 | 19.5 |
|  | Toughness (kg-mm) | 752 | 893 | 451 | 895 | 876 | 860 | 856 |
|  | Toughness retention rate (%) | 55.9% | 60.2% | 51.0% | 78.2% | 78.2% | 77.1% | 68.8% |
| 120° C. | Strength (kg) | 28.4 | 25.0 | 23.5 | 32.5 | 32.6 | 32.6 | 29.3 |
|  | Strength (g/d) | 4.1 | 3.6 | 3.4 | 4.7 | 4.7 | 4.7 | 4.2 |
|  | LASE (g/d, @5%) | 1.2 | 0.8 | 2.2 | 1.9 | 1.9 | 2.0 | 1.2 |
|  | Elongation (%) at load of 2.25 g/d | 8.8 | 9.1 | 4.5 | 6.0 | 5.9 | 5.8 | 7.8 |

TABLE 2-continued

|  | Comparative Example | | | Example | | | |
| --- | --- | --- | --- | --- | --- | --- | --- |
|  | 1 | 2 | 3 | 1 | 2 | 3 | 4 |
| L/E$_{120}$ | 0.9 | 0.6 | 3.4 | 2.2 | 2.2 | 2.4 | 1.1 |
| Elongation (%) at break | 18.2 | 21.5 | 10.1 | 17.2 | 17.0 | 16.8 | 18.2 |
| Toughness (kg-mm) | 717 | 887 | 429 | 890 | 878 | 868 | 825 |
| Toughness retention rate (%) | 53.3% | 59.8% | 48.5% | 77.7% | 78.3% | 77.8% | 66.3% |

As can be seen from the results in Table 2 above, the tire cords produced in Examples 1 to 4 of the present invention had excellent toughness retention rate and dimensional stability index (E–S) values compared to the tire cords produced in Comparative Examples 1 to 3. In particular, it can be seen that the tire cords produced in Examples 1 to 4 had improved elongation at a specific load, as measured in a high-temperature environment (120° C.), suggesting that these tire cords had excellent high-temperature heat resistance.

Although the present invention has been described in detail with reference to specific embodiments thereof, these descriptions are for the purpose of illustrating the present invention, and those skilled in the art will appreciate that various changes and modifications can be made without departing from the scope of the present invention. Accordingly, it should be understood that these changes fall within the scope of the present invention as defined by the appended claims.

DESCRIPTION OF REFERENCE NUMERALS

1: spinning pack
2: spinning nozzle
3: cooling zone
4: spun yarn
5: oil application device
6: first roller (GR1)
7: second roller (GR2)
8: third roller (GR3)
9: fourth roller (GR4)
10: fifth roller (GR5)
11: sixth roller (GR6)
12: yarn for polyester tire cord
13: sidewall
14: carcass
15: carcass ply
15': body part
16: turnup portion
17: bead portion
18: bead core
19: bead filler
20: belt structure
21: cap ply
22: belt portion
23: tread

The invention claimed is:

1. A polyester tire cord made of polyester yarn and having a 5% LASE of 1.2 g/d or more as measured according to ASTM D885 atz 80° C., a 5% LASE of 1.0 g/d or more as measured according to ASTM D885 at 120° C., and a toughness retention rate of 65% or more at 80° C. and 120° C. as calculated by the following Equation 6:

toughness retention rate $(T_{25}-T_{80})$=(toughness value at $T_{80}$/toughness value at $T_{25}$)×100 toughness retention rate $(T_{25}-T_{120})$=(toughness value at $T_{120}$/toughness value at $T_{25}$)×100   [Equation 6]

wherein
the toughness value at $T_{25}$ is a toughness value of the polyester tire cord, measured after standing at 25° C. and 65% RH for 24 hours, the toughness value at $T_{80}$ is a toughness value of the polyester tire cord, measured at an atmosphere temperature of 80° C., and the toughness value at $T_{120}$ is a toughness value of the polyester tire cord, measured at an atmosphere temperature of 120° C.,
the polyester yarn is manufactured by a spinning step and multi-stage drawing steps in which a specific draw ratio (a spin draft/a total draw ratio) is 800 to 1400,
the polyester tire has a cord fineness of 2,000 to 8,000 denier, 2 to 4 plies, and 200 to 400 TPM.

2. The polyester tire cord of claim 1, having an L/E$_{80}$ value of 1.5 kg/% to 3.5 kg/% as measured by the following Equation 1, and an L/E$_{120}$ value of 1.0 kg/% to 3.0 kg/% as measured by Equation 1:

L/E$_T$=LASE (kg, @5%)/elongation at load (%, @2.25 g/d)   [Equation 1]

wherein LASE represents a load at an elongation of 5%, measured at a predetermined temperature (T) (° C.), and E represents an elongation at a load of 2.25 g/d.

3. The polyester tire cord of claim 1, having a strength of 5.0 g/d or more and a shrinkage of 3% or less as measured at a static load of 0.05 g/d at 177° C. for 2 minutes.

4. The polyester tire cord of claim 1, wherein the polyester yarn simultaneously satisfies an elongation of 2.5% to 3.0% at a load of 2.25 g/d, an elongation of 5.0% to 6.0% at a load of 4.5 g/d, and an elongation of 7.5 to 9.0% at a load of 6.75 g/d.

5. The polyester tire cord of claim 4, wherein the polyester yarn simultaneously satisfies the following conditions (1) to (6):
(1) intrinsic viscosity (I.V.): 0.85 to 1.00
(2) strength: 7.0 g/d or higher
(3) amorphous orientation factor (AOF): 0.70 to 0.80
(4) shrinkage: 4.0% or less
(5) degree of crystallinity: 50% or higher
(6) dimensional stability: 8.5% or less.

6. The polyester tire cord of claim 1, wherein the polyester is polyethylene terephthalate, polybutylene terephthalate, polyethylene naphthalene, or poly(trimethylene terephthalate).

7. The polyester tire cord of claim 1, wherein the specific draw ratio (the spin draft/the total draw ratio) is 1000 to 1400.

8. The polyester tire cord of claim 1, wherein the spin draft is 1800 to 2400.

9. The polyester tire cord of claim 1, wherein the total draw ratio 1.7 to 1.9.

10. A tire comprising the polyester tire cord of claim 1.

11. The tire of claim 10, further comprising: a tread; a pair of sidewalls disposed on both sides of the tread; and a pair of bead portions disposed on radially inner sides of the sidewalls of the tire, wherein the carcass comprises the polyester tire cord.

* * * * *